United States Patent
Winer et al.

(10) Patent No.: US 12,540,836 B2
(45) Date of Patent: Feb. 3, 2026

(54) INDUCTIVE PROXIMITY SENSORS

(71) Applicant: Hamilton Sundstrand Corporation, Charlotte, NC (US)

(72) Inventors: Gordon Elliott Winer, Prescott, AZ (US); Muhammed Shihab, Ernakulam (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 239 days.

(21) Appl. No.: 18/216,055

(22) Filed: Jun. 29, 2023

(65) Prior Publication Data

US 2024/0027231 A1    Jan. 25, 2024

(30) Foreign Application Priority Data

Jul. 20, 2022    (IN) .............................. 202241041632

(51) Int. Cl.
*G01D 5/20*    (2006.01)

(52) U.S. Cl.
CPC ........... *G01D 5/2013* (2013.01); *G01D 5/202* (2013.01)

(58) Field of Classification Search
CPC ......... G01B 7/003; G01B 7/023; G01D 5/145
See application file for complete search history.

(56) References Cited

U.S. PATENT DOCUMENTS

| | | | | |
|---|---|---|---|---|
| 5,351,004 A * | 9/1994 | Daniels | .................. | G01V 3/081 |
| | | | | 324/207.16 |
| 6,628,118 B1 * | 9/2003 | Amini | ..................... | G01V 3/28 |
| | | | | 324/334 |
| 6,857,321 B2 | 2/2005 | Chang | | |
| 8,151,636 B2 | 4/2012 | Siraky | | |
| 2005/0083041 A1 * | 4/2005 | Schwartzbart | ....... | G01D 5/2013 |
| | | | | 324/207.17 |
| 2006/0261801 A1 * | 11/2006 | Busch | .................. | G01D 11/245 |
| | | | | 324/207.21 |
| 2009/0102467 A1 * | 4/2009 | Snell | ...................... | G01D 5/145 |
| | | | | 324/207.25 |
| 2017/0314967 A1 * | 11/2017 | Olsen | ...................... | G01D 5/142 |
| 2018/0002028 A1 * | 1/2018 | Polcuch | ................. | F15B 11/205 |
| 2020/0166376 A1 | 5/2020 | Bruwer et al. | | |

FOREIGN PATENT DOCUMENTS

| | | |
|---|---|---|
| DE | 4213866 A1 | 10/1992 |
| EP | 0204898 A1 | 12/1986 |

OTHER PUBLICATIONS

Extended European Search Report dated Dec. 20, 2023, for corresponding European Application No. 23186013.1.

* cited by examiner

*Primary Examiner* — Huy Q Phan
*Assistant Examiner* — Temilade S Rhodes-Vivour
(74) *Attorney, Agent, or Firm* — Kinney & Lange, P.A.

(57) ABSTRACT

A proximity sensor system can include a target assembly having one or more first targets comprising a first material having first magnetic permeability and one or more second targets comprising a second material having a second magnetic permeability. The system can include an inductive proximity sensor positioned relative to the target assembly to sense an inductance of the target assembly. The inductive proximity sensor and/or the target assembly are configured to move relative to the other.

20 Claims, 3 Drawing Sheets

INDUCTIVE PROXIMITY SENSORS

CROSS-REFERENCE TO RELATED APPLICATION

This application claims the benefit of India Provisional Patent Application No. 202241041632, filed Jul. 20, 2022, the entire contents of which is being incorporated herein by reference in its entirety.

FIELD

This disclosure relates to inductive proximity sensors.

BACKGROUND

The traditional inductive proximity sensor systems use the absence or presence of a ferromagnetic material to detect a position of the sensor (whether the sensor is in proximity of the ferromagnetic material or not). In such systems, e.g., used for a skew sensor system in aircraft, the signal is very weak and signal-to-noise ratio is low.

Such conventional methods and systems have generally been considered satisfactory for their intended purpose. However, there is still a need in the art for improved proximity sensors. The present disclosure provides a solution for this need.

SUMMARY

In accordance with at least one aspect of this disclosure, a proximity sensor system can include a target assembly having one or more first targets comprising a first material having first magnetic permeability and one or more second targets comprising a second material having a second magnetic permeability. The system can include an inductive proximity sensor positioned relative to the target assembly to sense an inductance of the target assembly. The inductive proximity sensor and/or the target assembly are configured to move relative to the other.

In certain embodiments, the first material (e.g., solid material) can be a ferromagnetic material. In certain embodiments, the second material (e.g., solid material) can be a diamagnetic material.

In certain embodiments, there can be an air gap between each first target and second target to provide a third inductance. Any suitable third or additional material is contemplated herein.

In certain embodiments, the target assembly can be linearly shaped (e.g., for sliding applications). Any other suitable shape for the target assembly (e.g., circular) and/or relative positions of first and second targets (e.g., concentric circles) for any other suitable application are contemplated herein.

In certain embodiments, the one or more first targets can include a plurality of first targets. The one or more second targets can include a plurality of second targets. In certain embodiments, the plurality of first targets can alternate with the plurality of second targets. Any suitable pattern configured to provide position information is contemplated herein.

In accordance with at least one aspect of this disclosure, a slat skew system can include a proximity sensor system as disclosed herein, e.g., as described above. The target assembly can be attached to a slat, and the inductive proximity sensor can be mounted to a wing structure. Certain embodiments of a slat skew system can include a plurality of the proximity sensor systems disposed at different locations of the slat.

Embodiments of a slat skew system can include a logic module configured to receive signals from each inductive proximity sensor to compare a plurality of slat skew signals to determine if there is a slat skew and/or an amount of slat skew. The logic module can include any suitable hardware and/or software modules. Any other suitable module(s) and/or logic (e.g., to determine a linear position of the target system based on a number of alternating inductance signals in a given direction) are contemplated herein.

In accordance with at least one aspect of this disclosure, determining if an inductive proximity sensor is disposed in proximity to a first target made of a first material or a second target made of a second material of a target assembly. The method can include determining a position of the proximity sensor relative to a target assembly. The first material can be a ferromagnetic material, wherein the second material is a diamagnetic material. The method can include determining whether there is slat skew on a slat.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
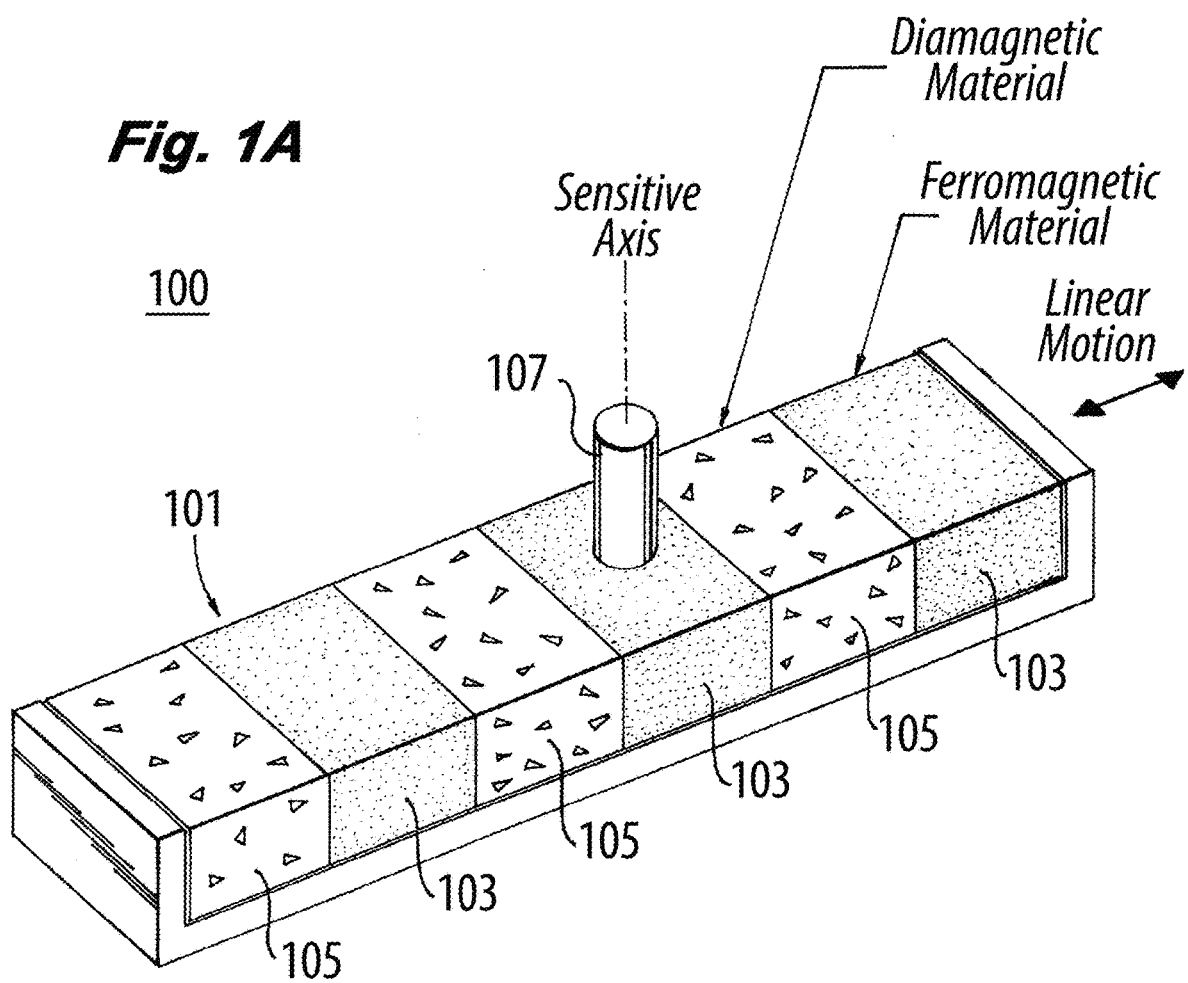
FIG. 1A is a perspective view of an embodiment of a proximity sensor system in accordance with this disclosure.

Reference will now be made to the drawings wherein like reference numerals identify similar structural features or aspects of the subject disclosure. For purposes of explanation and illustration, and not limitation, an illustrative view of an embodiment of a proximity sensor system in accordance with the disclosure is shown in FIG. 1A and is designated generally by reference character 100. Other embodiments and/or aspects of this disclosure are shown in FIGS. 1B-3. Certain embodiments described herein can be used to increase signal to noise ratio for proximity sensors, and/or provide additional information (e.g., actual position of a target relative to a sensor).

Figure 1B:
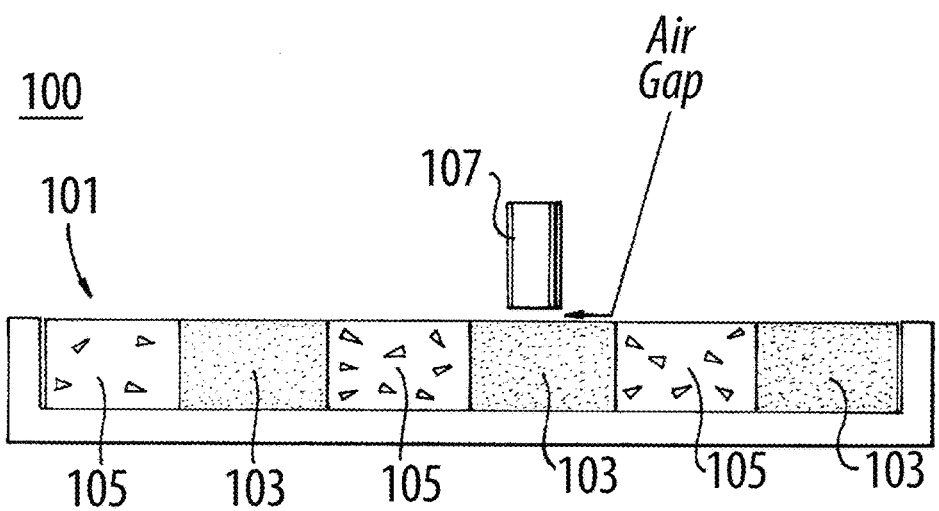
FIG. 1B is an elevation view of the embodiment of FIG. 1.

In accordance with at least one aspect of this disclosure, referring to FIGS. 1A and 1B, a proximity sensor system 100 can include a target assembly 101 having one or more first targets 103 comprising a first material having first magnetic permeability and one or more second targets 105 comprising a second material having a second magnetic permeability. The system 100 can include an inductive proximity sensor 107 positioned relative to the target assembly 101 (e.g., spaced apart a predetermined distance and having a perpendicular sensing axis) to sense an inductance of the target assembly 101.

The inductive proximity sensor 107 and/or the target assembly 101 can be configured to move relative to the other. The sensor 107 can be fixed to a structure and the target assembly 101 can be configured to move linearly relative to the inductive proximity sensor 107.

In certain embodiments, the first material (e.g., a solid material) can be a ferromagnetic material (e.g., steel, iron, etc.). In certain embodiments, the second material (e.g., a solid material) can be a diamagnetic material (e.g., copper). Any suitable ferromagnetic and diamagnetic materials are contemplated herein.

Figure 2A:
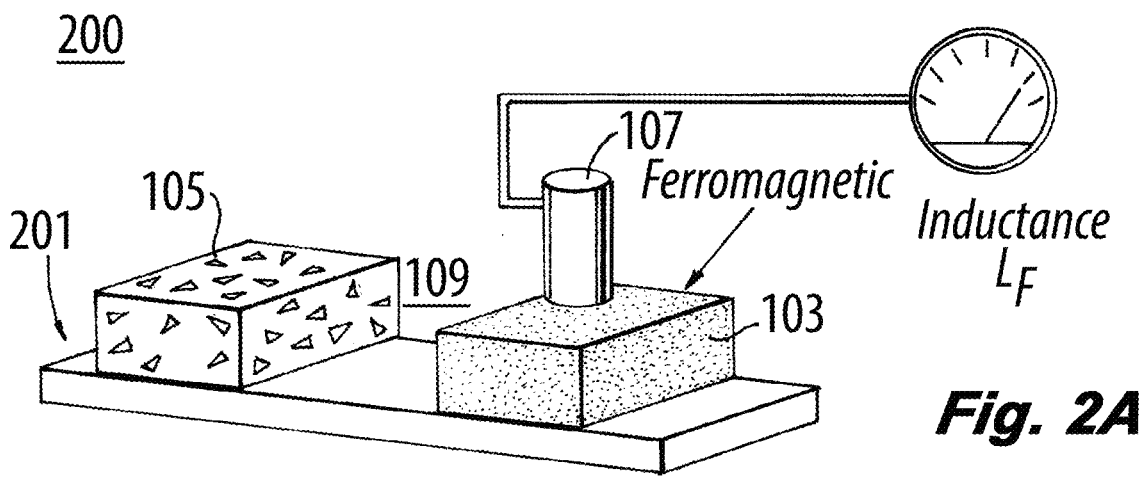
FIG. 2A is a perspective view of an embodiment of a proximity sensor system in accordance with this disclosure, schematically showing an inductance over a first target.
Figure 2B:
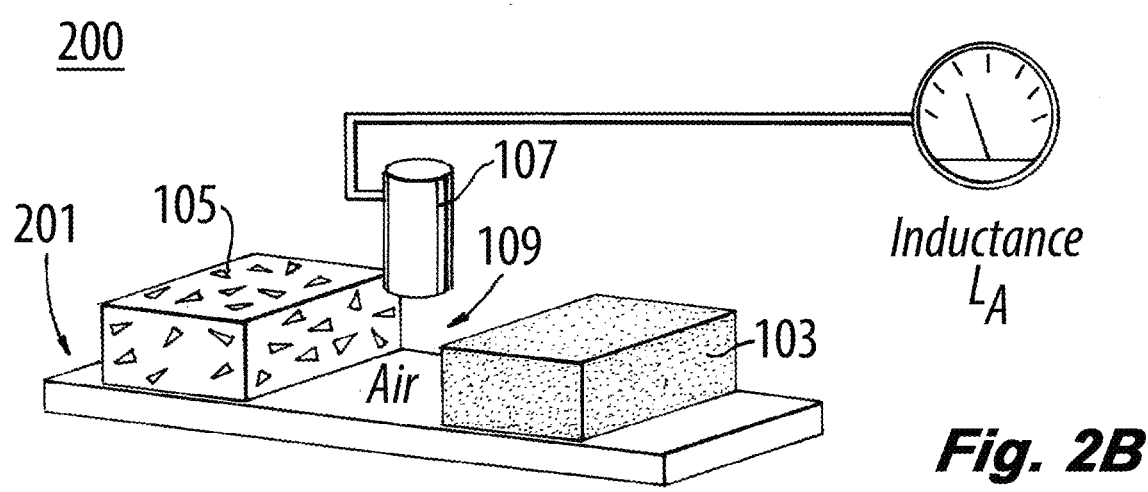
FIG. 2B is a perspective view of the embodiment of FIG. 2A, schematically showing an inductance over an air gap.
Figure 2C:
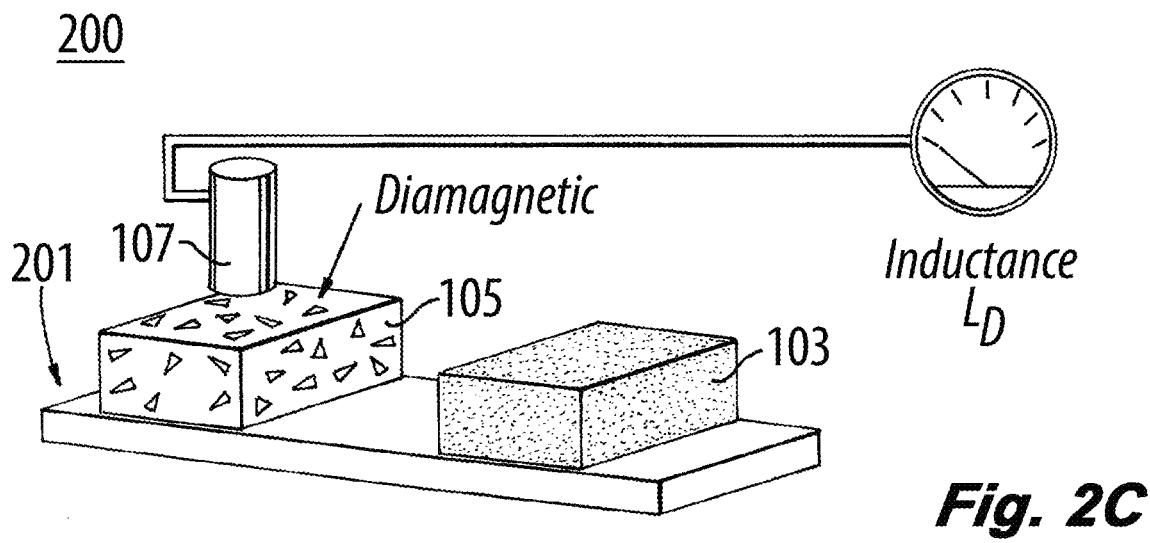
FIG. 2C is a perspective view of the embodiment of FIG. 2C, schematically showing an inductance over a second target.

In certain embodiments, referring additionally to FIGS. 2A, 2B, and 2C, there can be an air gap 109 between each first target 103 and second target 105 to provide a third inductance. Any suitable third or additional material is contemplated herein. Any other suitable pattern and/or ordering of the first target 103, the second target 105, the air gap 109, and/or any other suitable materials/targets are contemplated herein. For example, certain embodiments can include a first target 103 next to a second target 105, an air gap 109, the another first target 103 or second target 105.

In certain embodiments, as shown in the systems 100, 200, the target assembly 101, 201 can be linearly shaped (e.g., for sliding applications). Any other suitable shape for the target assembly 101, 201 (e.g., circular) and/or relative positions of first and second targets 103, 105 (e.g., concentric circles) for any other suitable application are contemplated herein.

In certain embodiments, the one or more first targets 103 can include a plurality of first targets 103, e.g., as shown. The one or more second targets 105 can include a plurality of second targets 105. In certain embodiments, the plurality of first targets 103 can alternate with the plurality of second targets 105. Any suitable pattern configured to provide sensor position information (e.g., to create larger inductance changes than just having a single material target system) is contemplated herein.

As shown in FIGS. 2A-2C, inductance using a ferromagnetic material and a diamagnetic material can increase the difference in inductance compared to just having a ferromagnetic material and air as in a traditional system. Embodiments can therefore enhance the signal to noise ratio, and/or can be used to provide additional position information.

Figure 3:
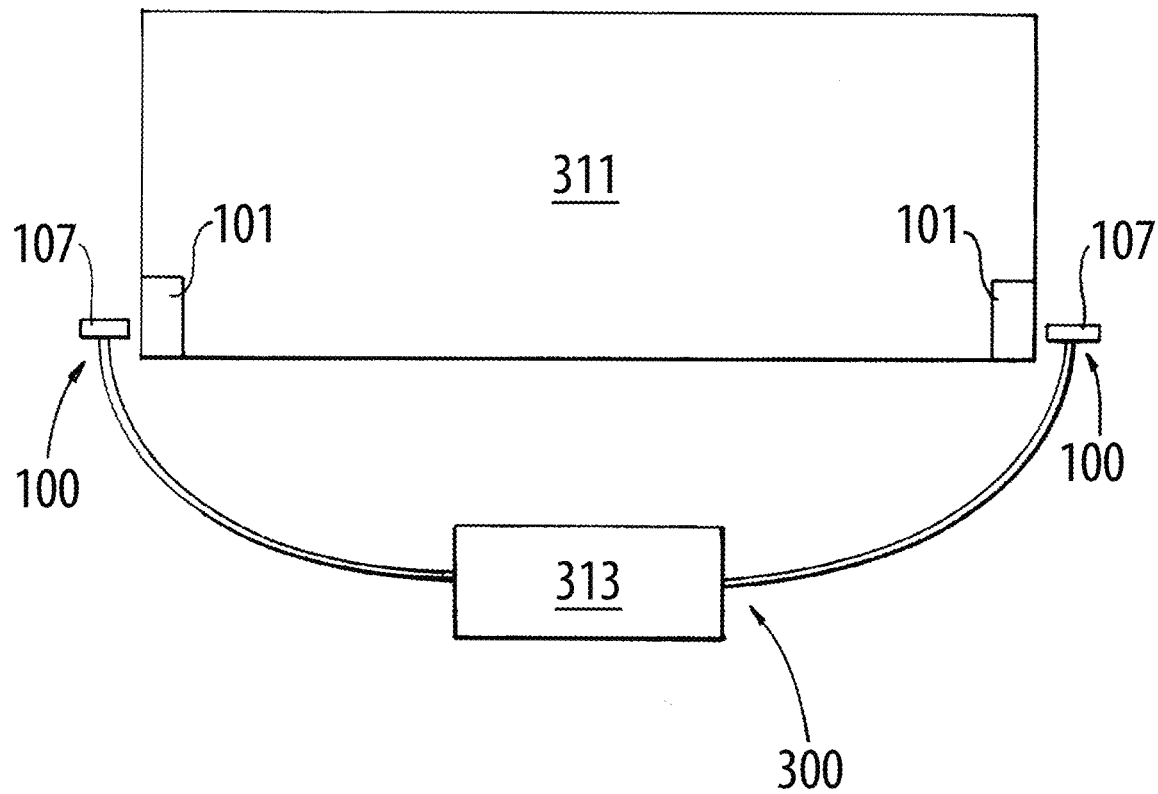
FIG. 3 is a schematic diagram of an embodiment of a slat skew system in accordance with this disclosure.

In accordance with at least one aspect of this disclosure, referring additionally to FIG. 3, a slat skew system 300 can include a proximity sensor system as disclosed herein, e.g., system 100, 200 as described above. As shown, the target assembly 101 can be attached to a slat 311, and the inductive proximity sensor 107 can be mounted to a wing structure (not shown for clarity). Certain embodiments of a slat skew system 300 can include a plurality of the proximity sensor systems 100 disposed at different locations of the slat 311 (e.g., on opposite edges as shown).

Embodiments of a slat skew system 300 can include a logic module 313 configured to receive signals from each inductive proximity sensor 107 to compare a plurality of slat skew signals (e.g., inductances) to determine if there is a slat skew and/or an amount of slat skew. For example, the systems 100 can be configured to both output the same inductance values (because the targets 103, 105 are arranged in the same order) when there is no skew as the slat 311 moves, so the logic module 313 can look for differences in inductance to determine that there is skew, and/or determine a quality of the inductance signals to determine an amount of skew. Any other suitable logic to determine skew is contemplated herein. The logic module 313 can include any suitable hardware and/or software modules. Any other suitable module(s) and/or logic (e.g., to determine a linear position of the target system based on a number of alternating inductance signals in a given direction) are contemplated herein.

In accordance with at least one aspect of this disclosure, determining if an inductive proximity sensor is disposed in proximity to a first target made of a first material or a second target made of a second material of a target assembly. The method can include determining a position of the proximity sensor relative to a target assembly. The first material can be a ferromagnetic material, wherein the second material is a diamagnetic material. The method can include determining whether there is slat skew on a slat.

Embodiments can use both a ferromagnetic material to increase inductance and a diamagnetic material to reduce inductance to provide a more noticeable change between targets. The sensor can be a coil of wire, and can be associated with electronics that take a reading from the sensor and convert it to an inductance value. Any suitable sensor is contemplated herein. A size of each target can be selected be large enough to cover the face of the sensor 107, and thickness can be selected to be enough to display a suitable inductance effect. Embodiments can sense an activated or deactivated state of inductance for example.

Embodiments can be applied to any suitable system, e.g., slat skew, landing gear doors, and any other suitable mechanical system where relative movement is of interest. Such sensors can be robust and have no moving parts. Embodiments can be mounted to the slat on the wing. A slat can skew due to improper loading either from aerodynamics or mechanical systems actuating slats. Each end of the slat can have one of target assembly and sensor, and if the sensors are out of synchronization, skew can be determined to exist.

Embodiments can use a ferromagnetic material for a "near" target and a diamagnetic material for a "far" target with an inductive proximity sensor to provide a wide swing of inductance between the near and far conditions (compared to the inductance swing of using ferromagnetic material and air gap). Near and far can be considered activated and deactivated in certain embodiments of this disclosure.

Ferromagnetic material has very large magnetic permeability which increases the inductance of the proximity sensor. Diamagnetic material reduces inductance by two mechanisms, diamagnetic material has a relative permeability less than 1 which decreases the inductance of the proximity sensor below the inductance in free air, and eddy currents in the diamagnetic target generates lines of flux (Lenz's law) to oppose the lines of flux from the Proximity Sensor. The net effect is a reduction in inductance. A traditional target uses the absence or presence of a ferromagnetic material, while embodiments use the presence of a ferromagnetic material, or the presence of diamagnetic material for at least two states.

A target strip with dissimilar target materials will allow a NEAR/FAR (activated/deactivated) detection system to operate with "larger operating air gap" than it was possible with "target-no target" based target strip. An actual application of this type of configuration is on the certain commercially available slat skew sensing systems that uses stationary proximity sensors and a movable track of alternating near/far targets.

Embodiments include a dissimilar permeability target for proximity sensors, for example. Embodiments can increase the small near/far inductance change to a larger near/far (activated/deactivated) inductance change in an inductive proximity sensor. This larger inductance change makes it easier to detect the near/far condition over larger sensor-to-target gaps. The larger near/far inductance change improves the system's signal-to-noise ratio.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to, wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A proximity sensor system comprising:
    a target assembly, comprising:
        a target axis;
        one or more first targets comprising a first material having first magnetic permeability on the target axis; and
        one or more second targets comprising a second material having a second magnetic permeability on the target axis, wherein the one or more second targets are spaced from the one or more first targets on the target axis; and
    an inductive proximity sensor positioned relative to the target assembly to sense an inductance of the target assembly, wherein the target assembly is linearly shaped and the inductive proximity sensor moves linearly along the target axis of the target assembly for determining position of the inductive proximity sensor along the target axis.

2. The system of claim 1, wherein the first material is a ferromagnetic material.

3. The system of claim 2, wherein the second material is a diamagnetic material.

4. The system of claim 3, further comprising an air gap between each first target and second target to provide a third inductance.

5. The system of claim 1, wherein the target assembly moves linearly along the target axis relative to the inductive proximity sensor.

6. The system of claim 5, wherein the one or more first targets include a plurality of first targets, wherein the one or more second targets include a plurality of second targets.

7. The system of claim 6, wherein the plurality of first targets alternate with the plurality of second targets.

8. A slat skew system, comprising:
    a proximity sensor system comprising:
        a target assembly, comprising:
            a target axis;
            one or more first targets comprising a first material having first magnetic permeability on the target axis; and
            one or more second targets comprising a second material having a second magnetic permeability on the target axis; and
        an inductive proximity sensor positioned relative to the target assembly to sense an inductance of the target assembly, wherein the target assembly is linearly shaped, and wherein the target assembly is attached to a slat, and wherein the inductive proximity sensor is mounted to a wing structure, and wherein the inductive proximity sensor moves linearly along the target axis of the target assembly having at least two targets spaced apart along the target axis for determining position of the inductive proximity sensor along the target axis.

9. The system of claim 8, wherein the first material is a ferromagnetic material.

10. The system of claim 9, wherein the second material is a diamagnetic material.

11. The system of claim 10, further comprising an air gap between each first target and second target to provide a third inductance.

12. The system of claim 8, wherein the target assembly moves linearly along the target axis relative to the proximity sensor.

13. The system of claim 12, wherein the one or more first targets include a plurality of first targets, wherein the one or more second targets include a plurality of second targets.

14. The system of claim 13, wherein the plurality of first targets alternate with the plurality of second targets.

15. The system of claim 14, further comprising a plurality of the proximity sensor systems disposed at different locations of the slat.

16. The system of claim 15, further comprising a logic module configured to receive signals from each inductive proximity sensor to compare a plurality of slat skew signals to determine if there is a slat skew and/or an amount of slat skew.

17. A method, comprising:
    moving an inductive proximity sensor linearly along a target axis of a target assembly that is linearly shaped and having a first target made of a first material on the target axis and a second target made of a second material on the target axis; and
    determining if the inductive proximity sensor is disposed in proximity to the first target made of the first material or the second target made of the second material of the target assembly.

18. The method of claim 17, further comprising determining a position of the inductive proximity sensor relative to the target assembly.

19. The method of claim 17, wherein the first material is a ferromagnetic material, wherein the second material is a diamagnetic material.

20. The method of claim 17, further comprising determining whether there is slat skew on a slat.

* * * * *